(12) United States Patent
Bella

(10) Patent No.: US 12,011,951 B1
(45) Date of Patent: Jun. 18, 2024

(54) SCRATCHLESS DECORATIVE COVER

(71) Applicant: Phoenix U.S.A., Inc., Cookeville, TN (US)

(72) Inventor: John Lawrence Bella, Cookeville, TN (US)

(73) Assignee: Phoenix U.S.A. Inc., Cookeville, TN (US)

( * ) Notice: Subject to any disclaimer, the term of this patent is extended or adjusted under 35 U.S.C. 154(b) by 746 days.

(21) Appl. No.: 16/930,316

(22) Filed: Jul. 16, 2020

Related U.S. Application Data

(60) Provisional application No. 62/874,371, filed on Jul. 15, 2019.

(51) Int. Cl.
   *B60B 7/14* (2006.01)
   *B60B 7/00* (2006.01)
   *B60B 7/02* (2006.01)
   *B60B 7/06* (2006.01)

(52) U.S. Cl.
   CPC .......... *B60B 7/0013* (2013.01); *B60B 7/0053* (2013.01); *B60B 7/02* (2013.01); *B60B 7/068* (2013.01); *B60B 7/14* (2013.01)

(58) Field of Classification Search
   CPC ....... B60B 7/0013; B60B 7/0053; B60B 7/02; B60B 7/068; B60B 7/14; F16B 21/16; F16B 21/183; F16B 21/186
   USPC ............... 301/108.1, 108.3, 108.4, 119, 122, 301/111.01, 111.03, 35.623, 37.31, 37.34, 301/37.371, 37.42, 37.101, 37.102, 37.37, 301/37.104; 411/177
   See application file for complete search history.

(56) References Cited

U.S. PATENT DOCUMENTS

| | | | | |
|---|---|---|---|---|
| 4,382,635 A * | 5/1983 | Brown | .................... | B60B 7/068 301/37.35 |
| 5,037,259 A * | 8/1991 | Duran | .................... | F16B 39/28 411/173 |
| 5,071,197 A * | 12/1991 | Webster | .................... | B60B 7/08 301/37.372 |
| 5,325,461 A * | 6/1994 | Tanaka | .................... | G10L 19/06 704/E19.024 |
| 5,667,281 A * | 9/1997 | Ladouceur | ............ | F16B 33/006 301/37.375 |
| 5,752,794 A * | 5/1998 | Krawczak | ............... | F16B 37/14 411/374 |
| 5,842,749 A * | 12/1998 | DiMarco | .................... | B60B 7/14 301/108.4 |
| 6,022,081 A * | 2/2000 | Hauler | .................... | B60B 7/08 301/37.42 |
| 6,030,049 A * | 2/2000 | Russell | .................... | B60B 7/14 301/37.375 |
| 6,682,151 B1 * | 1/2004 | Van Houten | .............. | B60B 7/12 301/37.373 |
| 6,913,322 B1 * | 7/2005 | Allen | ........................ | B60B 7/14 301/37.371 |

\* cited by examiner

*Primary Examiner* — S. Joseph Morano
*Assistant Examiner* — Eva L Comino
(74) *Attorney, Agent, or Firm* — Bradley Arant Boult Cummings LLP; Phillip E. Walker; Alex H. Huffstutter

(57) ABSTRACT

The present disclosure is directed at decorative and protective covers for wheels, or wheel simulators for wheels. More particularly, the present disclosure is directed at an improved attachment between the wheel simulator and the wheel and a device and method for a decorative cover or trim over a motor vehicle wheel without scratching the main painted or polished wheel surface.

18 Claims, 4 Drawing Sheets

SCRATCHLESS DECORATIVE COVER

This is a non-provisional patent application claiming priority to U.S. Provisional Patent Application Ser. No. 62/874,371, filed Jul. 15, 2019, and entitled "Scratchless Wheel Cover".

This non-provisional patent application is filed by applicant Phoenix U.S.A., Inc. for the inventor John Lawrence Bella, a citizen of the United States, residing at 1070 Wilson Avenue, Cookeville, Tennessee, for the invention of an "Scratchless Wheel Cover."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety

FIELD OF INVENTION

The invention concerns the attachment of wheel trims and covers to wheels.

BACKGROUND

The present disclosure is directed at decorative and protective covers for wheels, or wheel simulators for wheels. More particularly, the present disclosure is directed at an improved attachment between the wheel simulator and the wheel and a device and method for a decorative cover or trim over a motor vehicle wheel without scratching the main painted or polished wheel surface.

Vehicles and automobiles are the main form of transportation currently used in the United States. Various efforts have been made in the past to improve the function, use, and appearance of these vehicles both externally and internally. For example, the concept of using covers for wheels for both protective and decorative purposes is known in the art.

Various devices and structures have commonly been used to secure wheel covers to the wheels of vehicles in order to enhance the aesthetic value of the vehicle and apply a level of protection from particles and fluids entering the wheels. For example, some conventional covers include holes that allow the wheel studs to pass through where a nut can be screwed onto the stud to secure the cover to the wheel. This nut is sometimes the actual lug nut securing the wheel to the axle. However, to obtain a secure connection, covers typically directly engage the wheel surface, which scratches the surface.

Other conventional wheel covers commonly include a large number of parts which require specialized tools in order to affix the covers to the vehicle's wheels. These prior art wheel covers normally require an extended period of time for installation due to the excessive number of parts and lack of familiarity of the user with those parts.

Conventionally, there have been prior art attempts, such as U.S. Pat. Nos. 6,652,036, 6,082,829, 5,542,750, 5,340,201, and 5,031,965 that either require the wheel cover to attach directly under the lug nuts of the wheel or use some type of glue to glue the wheel cover into place. Both of these are typically undesirable. First, there are restrictions and safety issues associated with altering the attachment between the lug nuts and vehicle studs, which attaches the wheel and tire to the axle of the vehicle. As such, any attachment of a wheel cover to the wheel should not base that attachment between the contact face of the lug nuts and the surface of the wheel. Second, there is difficulty associated with the removal of wheel covers that have been glued to the wheel when maintenance is needed in the wheel, brake, tire, and axle areas. Both of these attachment methods also scratch the surface of the wheel face.

There have still been prior art attempts to make a wheel cover that snaps into place or fits into the peripheral edge of the vehicle wheel. For example, U.S. Pat. Nos. 6,402,253, 6,409,277, and 6,672,678 are directed at wheel covers that include an outer wheel edge clip that is designed to lock into the peripheral edge of the vehicle wheel. These patents have several drawbacks in the fact that each wheel cover must be sized, normally within a small tolerance range, for each wheel to which it is placed. This restricts the use of these wheel covers to retrofit vehicles. Additionally, these wheel covers require the wheel to have an extended outer peripheral edge or have enough lip to engage specific portions of these wheel covers. Once again this direct attachment method also scratches the surface of the wheel face.

Therefore, there is a need for a simple method of securing the wheel cover or trim to the lug nut without scratching the primary surface that the cover is supposed to protect.

BRIEF SUMMARY OF THE INVENTION

Figure 1:
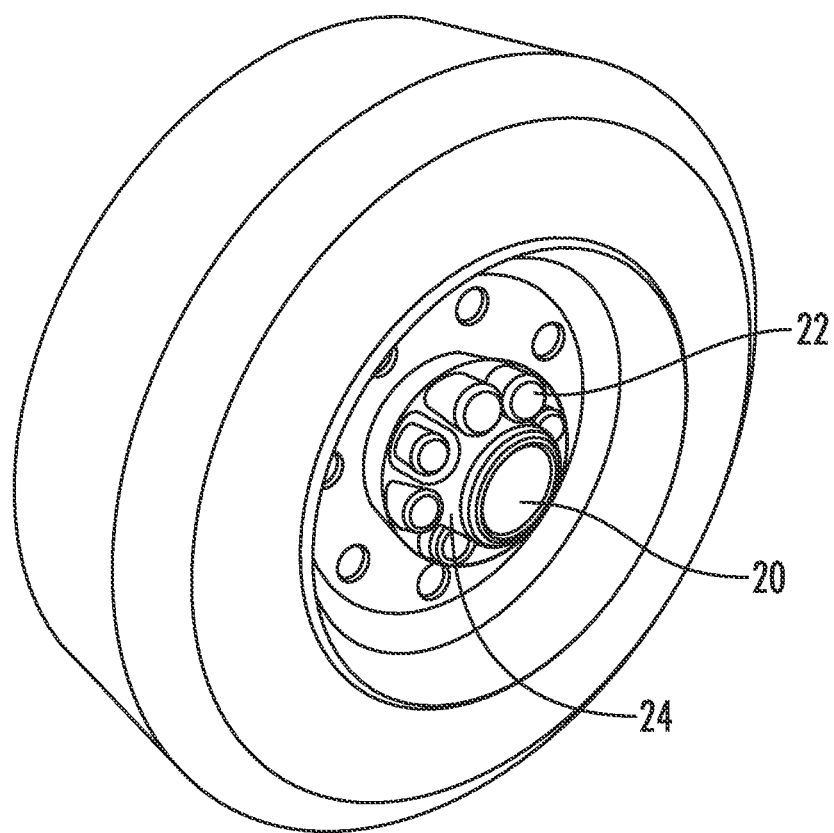
FIG. 1 is a perspective view of a wheel cover made in accordance with the current disclosure and attached to a wheel.

Disclosed herein are a wheel cover, a wheel cover attachment system, a wheel cover kit, and method of use thereof for attaching a wheel cover to the wheel of a vehicle. The preferred wheel cover, system, and kit overcome the disadvantages associated with the prior art and includes other advantages over the current art.

It is therefore a general object of the present invention to provide an improved wheel simulator for a wheel.

Another object of the present invention is to provide an improved attachment system for a wheel simulator for a wheel.

Still another object of the present invention is to provide an improved attachment system for a wheel simulator that can be adapted to fit various wheels and to properly fit that wheel and not interfere with the structure and function of that wheel.

Yet another object of the present invention is to provide an improved attachment system for a wheel simulator that can be adapted to fit various wheels not interfere with any wheel weights positioned on that wheel.

Yet still another object of the present invention is to provide an improved attachment system for a wheel simulator that can attach to the wheel fasteners of a wheel without interfering with the attachment of those wheel fasteners to the wheel.

Other and further objects, features and advantages of the present invention will be readily apparent to those skilled in the art upon reading of the following disclosure when taken in conjunction with the accompanying drawings.

DETAILED DESCRIPTION

Referring now to FIGS. 1-7, a wheel cover system made in accordance with the current disclosure is shown and generically designated by the numeral 40. In this disclosure, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use.

The wheel cover system includes a wheel cover 20 and one or more cover fasteners 2. The wheel cover 20 and cover fasteners 20 are designed to engage to a portion of a wheel 30 of a vehicle.

FIG. 1 depicts one embodiment of the wheel cover 20, or wheel simulator 20. The wheel cover 20 is molded to cover the primary wheel, or hubcap, 30 that has and outer wheel surface 32. The cover 20 can include an exterior side 24 that can be molded into a decorative, or ornamental, design. For example, and as shown in FIG. 1, the exterior side 24 can have a cover surface 26 that can mimic or simulate the primary wheel surface 32. In other embodiments, the cover surface 26 may take on an ornamental or aesthetic design distinct from the primary wheel surface 32.

The cover 20 can include an interior side 28 that has one or more pods 22. Each pod 22 is preferably molded into the cover 20. A pod 22 is preferably positioned on the interior side 28 of the cover 20 to correspond with, or be above, the location where a stud 34 would extend outward from the wheel well. In some embodiments, a cover 20 may be specifically designed to cover a particular wheel, in which case the pods 22 could be molded to cover each stud 34 present on that particular wheel design. In other embodiments, the cover 20 may be designed to cover multiple different variations of wheels. In such cases there may be more pods 22 than studs on a particular wheel. In other embodiments, there may be fewer pods 22 than studs on a particular wheels, so long as there are enough pods 22 aligned with studs to secure the cover 20 to the wheel 30, as described further below.

Figure 2:
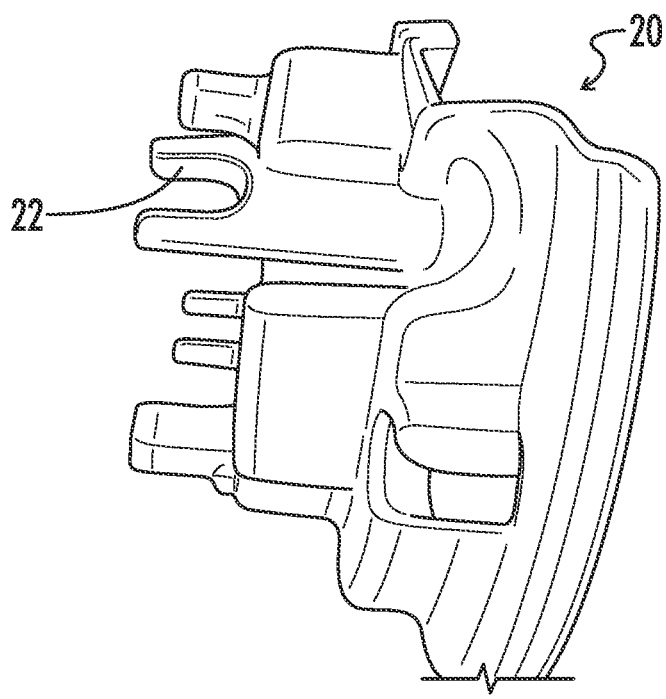
FIG. 2 is a is a perspective view of a wheel cover made in accordance with the current disclosure.
Figure 3:
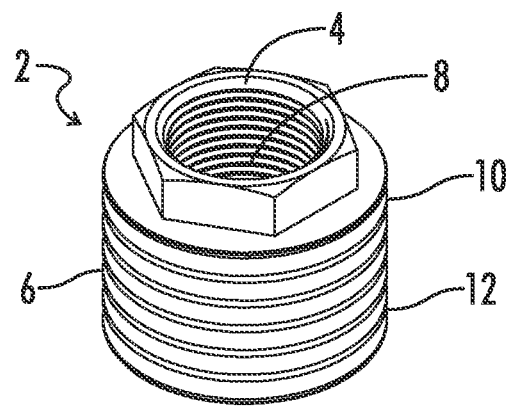
FIG. 3 is a is a perspective view of a fastener for a wheel cover made in accordance with the current disclosure.

FIG. 2 depicts a perspective view of the cover 20. The interior surface of each pod 22 is generally circular and sized to fit over and/or around a threaded stud 34 extending from the wheel housing. Each Pad 22 is also sized to fit over and or around a cover fastener 2, which can also be described as a double fastener, a nut, or a dual-nut 2. The cover fastener 2 is configured and sized to engaging a stud, and more specifically the threads of a stud FIG. 3 depicts a perspective view of a cover fastener 2 in accordance with one embodiment of the invention. The cover fastener 2 preferably has head 4 and a body 6. As shown in FIG. 1, the head 4 is preferably hex-shaped, but can be any shape to frictionally fit with a portion of one of the pods 22. As also shown in FIG. 1, the body 6 is preferably circular, but can be any shape to frictionally fit with another portion of one of said pod 22. The head 4 and body 6 are preferably formed together in a single piece with the head 4 centered over the body 6. The cover fastener 2 can have a threaded internal bore 8. The threading of the bore 8 is sized for engaging a typical stud 34 (see FIG. 7) of a wheel of a vehicle. The cover fastener 2 may be a formed as a lug nut, or alternatively, the cover fastener 2 may engage the stud 34 above a traditional lug nut, depending on the size of the traditional lug nut. For example, in some embodiments, the cover fastener 2 may have an outer diameter of approximately 37.53 mm, an inner diameter of approximately 26.16 mm, and the hex head 4 can have a width of approximately 27 mm between two opposing sides of the head 4. These dimensions can be varied by one skilled in the art to interact with studs in conventional wheel assemblies.

The outer surface 10 of the body 6 of the cover fastener 2 preferably has a series of grooves 12 machined into the surface 10. The grooves 12 are sized, spaced and configured to frictionally fit a portion of the wheel cover, for example a pod 22. Additionally, the head 4 is also sized and configured to frictionally fit a portion of the wheel cover, for example another portion of the pod 22. As shown in the figures, in a preferred embodiment six equally spaced and sized grooves 12 are circumscribed on the outer surface 10. As an example, in proportion with the measurements described above, the grooves 12 are approximately 0.75 mm deep and approximately 4 mm wide from trough to trough. While the grooves 12 are preferably machined into the outer surface 10, the grooves 12 may also be formed in a mold or other manner of production.

Figure 4:
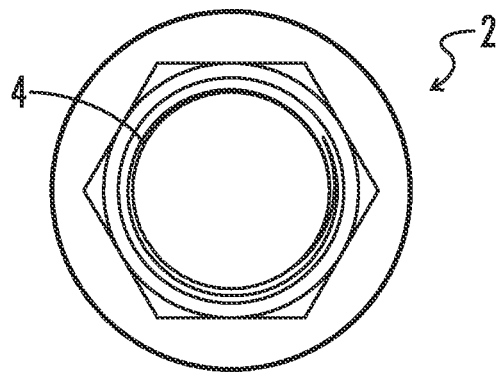
FIG. 4 is a top view of the fastener of FIG. 3.
Figure 5:
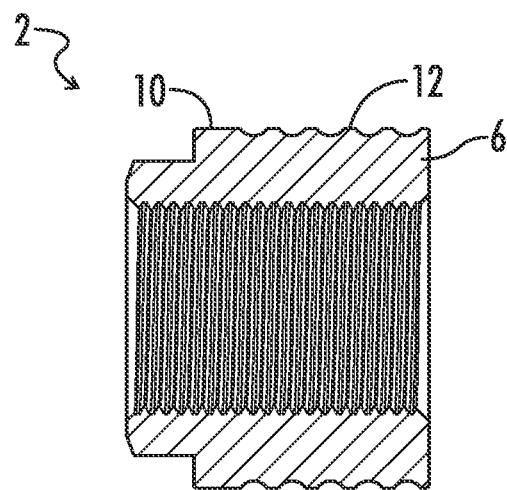
FIG. 5 is a cross sectional view of the fastener of FIG. 3.

FIGS. 4 and 5 show additional views of the cover fastener 2. FIG. 4 depicts a top-down view showing the of the head 4 of the nut 2. FIG. 5 depicts a profile cut-through view showing the threaded bore 8 on the interior of the nut 2, and the grooves 12 on the outer surface 10 of the body 6.

Figure 6:
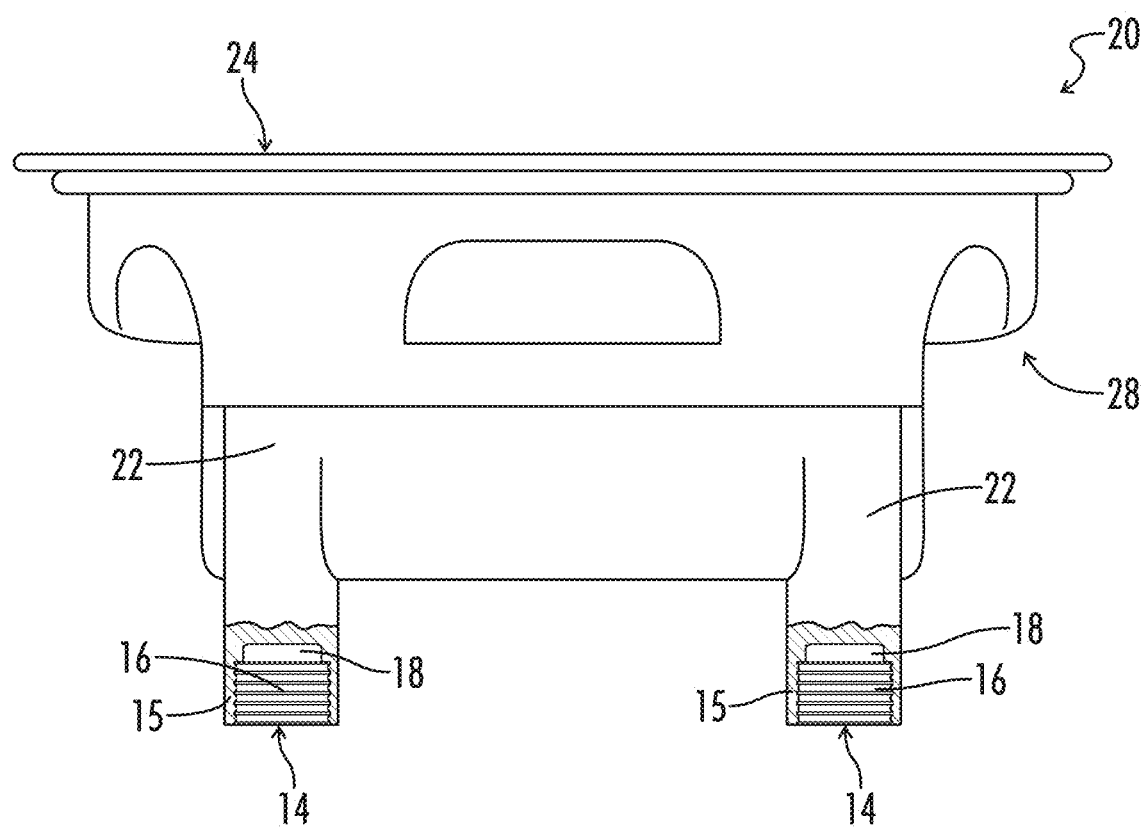
FIG. 6 is a cross sectional view of a wheel cover made in accordance with the current disclosure.

FIG. 6 depicts a cover fastener 2 having a partial a cross-section showing an interior surface of the pod 22 according to one embodiment of the disclosure. The pod 22 includes an open 14 sized and positioned to accept a cover fastener 2. The opening 14 has contours 16 positioned on the inside surface 15 that correspond with the grooves 12 of the outer surface of the bore 8. At the end of the opening 14 is a seat 18 that is shaped and sized to engage the head 4 of the cover fastener 2. As will further explained, the engagement of the contours 16 to the grooves 12 and the seat 18 to the head 4 secures each pod 22 to the cover fastener 2. Further, with each pod 22 extending from the wheel cover 20 and each cover fastener 2 secured to a stud 34 of the wheel 30, the wheel cover 20 can be effectively attached to the vehicle without direct attachment to the wheel 20 or the outer wheel surface 32. In some embodiments, as illustrated in FIG. 6, each groove 12 of the grooved exterior 10 may be separate and spaced apart. In some optional embodiments, as illustrated in FIG. 6, each groove 12 of the grooved exterior 10 may be defined circumferentially about the respective nut 2 and oriented perpendicular to an axis of the respective nut 2.

Figure 7:
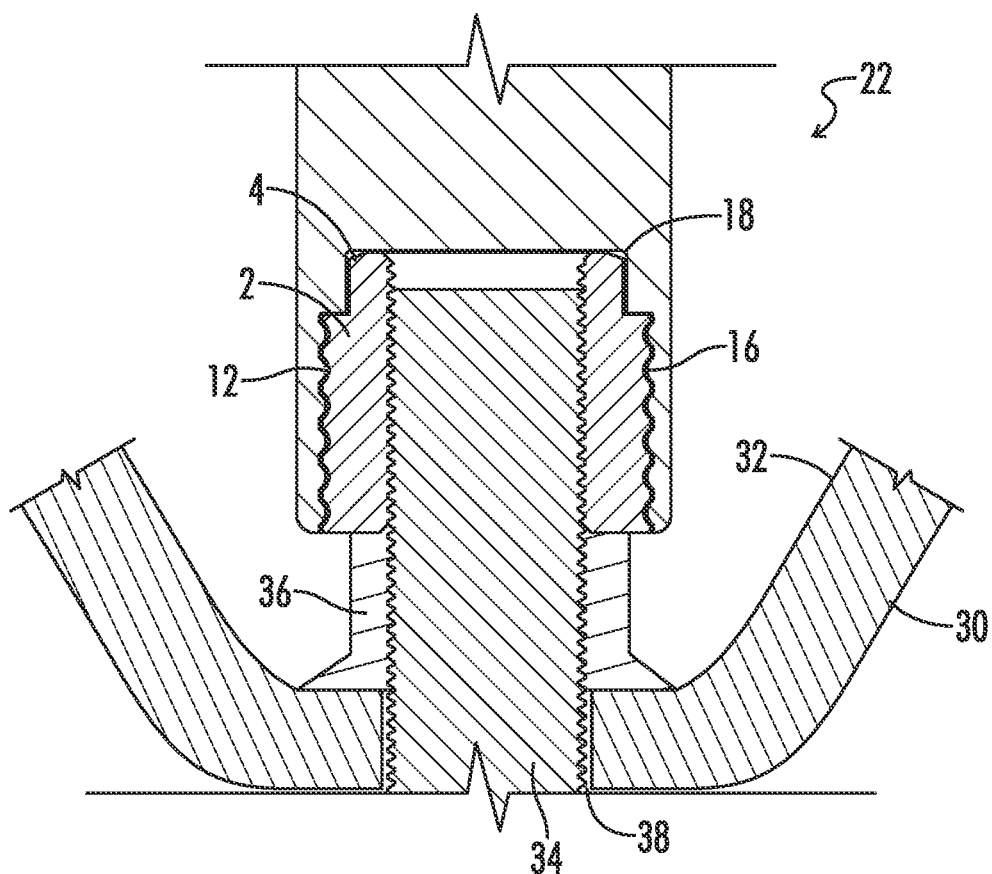
FIG. 7 is a cross sectional view of the engagement between a pod, a cover fastener, a stud, a lug nut, and a wheel.

FIG. 7 depicts a cross-section showing the engagement between pod 22, a cover fastener 2, a stud 34, a lug nut 36, and a wheel 30. The stud 34 extends through an opening 38 in the wheel 30. A lug nut 36 can be secured to the stud 34 there by securing the wheel 30 to the vehicle. The cover fastener 2 can then be attached to the stud 34 proximate to or touching the lug nut 36. A pod can then be aligned and frictionally engaged to the cover fastener 2. More specifically, the contours 16 of the pod 22 can frictionally engage the grooves 12 to restrict the longitudinal motion of the pod 22 along the axis of the cover fastener 2. Further, the seat 18 can frictionally engage the head 4 to restrict the rotational motion of the pod 22 relative to the cover fastener 2. Additionally, when in a the wheel cover securing system multiple pods are each engaging a different cover fastener 2 and each cover fastener 2 is engaging a different stud 34, the relative movement of the wheel cover 20 is restricted in both the axial and rotational directions to effectively secure the wheel cover to the studs 34 and in a fix relationship to the wheel 30 with out physical engagement to the wheel 30.

It will be understood that the above described dimensions and sizes can be modified as desired to fit variously sized studs on vehicles (e.g., cars, trucks, eighteen-wheelers, golf carts, go-karts, ATVs, etc.). The size of the nut and the number and size of the grooves may vary depending on the nature of the vehicle. For example, an eighteen-wheeler would preferably use a larger, more robust nut with deeper grooves in view of the size of the wheel, the increased amount of vibration on the wheel, and the increased forces that are common on such large vehicles. In contrast, a golf cart could use a smaller nut with smaller grooves.

Thus, although there have been described particular embodiments of the present invention of a new and useful Scratchless Wheel Cover, it is not intended that such references be construed as limitations upon the scope of this invention except as set forth m the following claims.

I claim:

1. A scratchless wheel cover system for a wheel on a vehicle, comprising:
   at least two nuts, each nut adapted to screw onto a respective stud of the wheel and having a grooved exterior surface, each groove of the grooved exterior surface being separate, independent, and spaced apart; and
   a wheel cover comprising at least two pods, each pod located on the cover to align with each of the at least two nuts when the cover is placed over the wheel studs, each pod including contours matching the grooved exterior surface of each nut of the at least two nuts and configured to frictionally engage the grooved exterior surface of each nut of the at least two nuts.

2. The scratchless wheel cover system of claim 1, wherein each of the at least two nuts has at least four grooves.

3. The scratchless wheel cover system of claim 1, wherein the cover has pods located such that it can attach to more than one wheel stud configuration.

4. The scratchless wheel cover system of claim 1, wherein the number of nuts equals the number of wheel studs on the wheel and the number of pods equals the number of wheel studs on the wheel.

5. A scratchless wheel cover system for a wheel on a vehicle, comprising:
   first and second nuts, each of the first and second nuts adapted to screw onto a respective stud of the wheel and having a grooved exterior, each groove of the grooved exterior being separate, independent, and spaced apart; and
   a wheel cover comprising first and second pods, each of the first and second pods located on the cover to align with each of the first and second nuts when the cover is placed over the wheel studs, each of the first and second pods including contours matching the grooved exterior of each of the first and second nuts and configured to frictionally engage the grooved exterior of each of the first and second nuts.

6. The scratchless wheel cover system of claim 1, wherein a number of grooves of each of the at least two nuts equals a number of contours of the at least two pods.

7. The scratchless wheel cover system of claim 1, wherein each groove of the grooved exterior of the at least two nuts is about 0.75 mm deep and about 4 mm wide.

8. The scratchless wheel cover system of claim 1, wherein each of the at least two nuts includes a hex-shaped head portion and a body portion, the grooved exterior defined along the body portion.

9. The scratchless wheel cover system of claim 8, wherein each of the at least two pods includes a seat configured to engage the hex-shaped head of each of the at least two nuts and prevent rotational motion of each of the at least two nuts.

10. A method for apply a wheel cover to a wheel of a vehicle, the method comprising:
    screwing a first nut onto a first wheel stud and a second nut onto a second wheel stud, the first and second nuts each having a grooved exterior surface, each groove of the grooved exterior surface being separate, independent, and spaced apart;
    aligning a cover comprising a first pod and a second pod over the wheel studs, such that the first pod is oriented over the first nut and the second pod is oriented over the second nut; and
    pressing the cover onto the nuts to frictionally engage the grooved exterior surface of the first nut within contours of the first pod and to frictionally engage the grooved exterior surface of the second nut within contours of the second pod, the contours of each of the first and second pods matching the grooved exterior surface of each of the first and second nuts.

11. The method of claim 10, wherein the step of pressing further comprises:
    engaging the grooved exterior surface of the first and second nuts with the contours defined within each of the first and second pods, respectively.

12. The method of claim 11, wherein:
    the number of grooves of each of the first and second nuts equals the number of contours of each of the first and second pods, respectively.

13. The method of claim 11, further comprising:
    engaging a head of each of the first and second nuts with a seat of each of the first and second pods, respectively.

14. The scratchless wheel cover system of claim 5, wherein a number of grooves of each of the at least two nuts equals a number of contours of the at least two pods.

15. The scratchless wheel cover system of claim 5, wherein each of the at least two nuts has at least four separate grooves.

16. The scratchless wheel cover system of claim 5, wherein the number of nuts equals the number of wheel studs on the wheel and the number of pods equals the number of wheel studs on the wheel.

17. The scratchless wheel cover system of claim 5, wherein each groove of the grooved exterior of the at least two nuts is about 0.75 mm deep and about 4 mm wide.

18. The scratchless wheel cover system of claim 5, wherein each of the at least two nuts includes a hex-shaped head portion and a body portion, the grooved exterior defined along the body portion, further wherein each of the at least two pods includes a seat configured to engage and prevent rotational motion of the hex-shaped head of each of the at least two nuts.

* * * * *